United States Patent [19]

Cairns

[11] Patent Number: 5,461,347

[45] Date of Patent: Oct. 24, 1995

[54] APPARATUS AND METHOD FOR GEOMETRICALLY MODULATING ELECTROMAGNETIC RADIATION AND A RECEIVER FOR DECODING GEOMETRICALLY MODULATED SIGNALS

[75] Inventor: John P. Cairns, Townsend, Del.

[73] Assignee: Quantum Optics Corporation, St. Georges, Del.

[21] Appl. No.: 185,695

[22] Filed: Jan. 24, 1994

[51] Int. Cl.⁶ .............................. H03C 1/00; H03C 3/00
[52] U.S. Cl. .......................... 332/119; 332/151; 329/316
[58] Field of Search ..................... 332/103, 119, 332/120, 151, 152, 185; 329/316, 317, 363, 364, 327; 375/42, 44, 269, 271; 455/61

[56] References Cited

U.S. PATENT DOCUMENTS 4,170,764  10/1979  Salz et al. ........................ 332/117
4,199,821  4/1980   Munday ............................. 375/60
4,521,749  6/1985   Lockhart .......................... 332/117
5,079,525  1/1992   Ishikawa et al. ................. 332/120

FOREIGN PATENT DOCUMENTS 0674022  11/1963  Canada ............................. 332/119

Primary Examiner—Robert J. Pascal
Assistant Examiner—David H. Vu
Attorney, Agent, or Firm—Connolly & Hutz

[57] ABSTRACT

A novel communication apparatus comprising a transmitter capable of geometrically modulating an existing modulated electromagnetic signal, a method for geometrically modulating a frequency modulated signal, and a receiver for decoding the modulated signal waveform without damaging the underlying harmonic content of the carrier wave and decoding the underlying modulated electromagnetic signal.

24 Claims, 9 Drawing Sheets

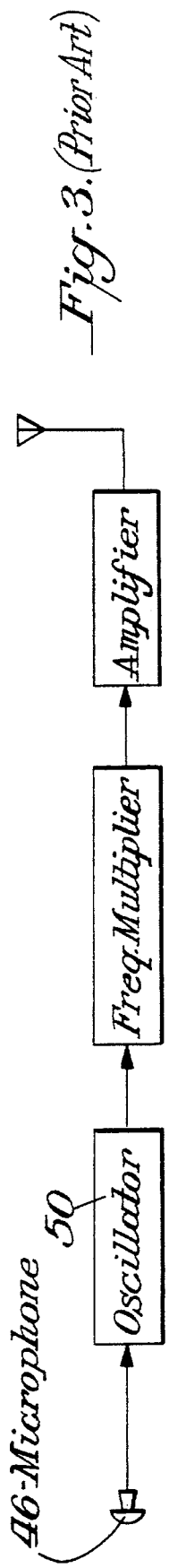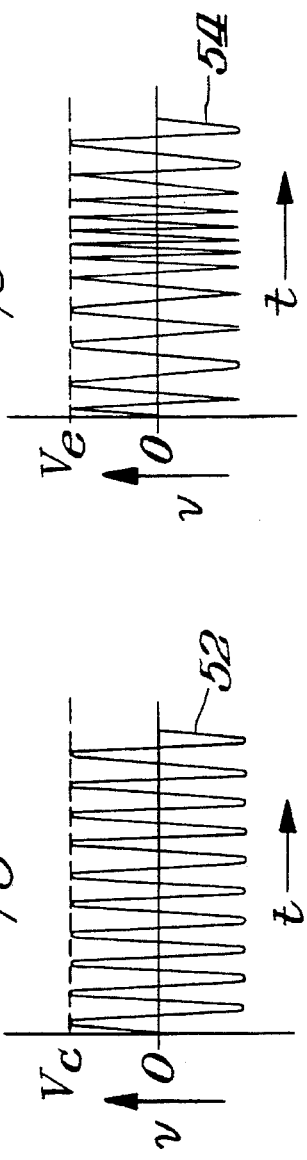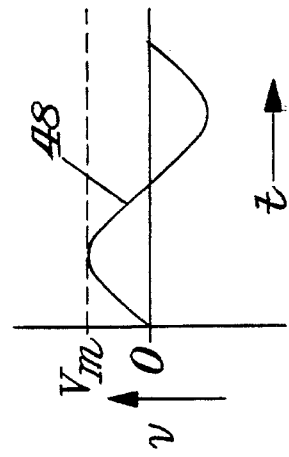
Fig.3.(Prior Art)
Fig.3A.(Prior Art)
Fig.3B.(Prior Art)
Fig.3C.(Prior Art)

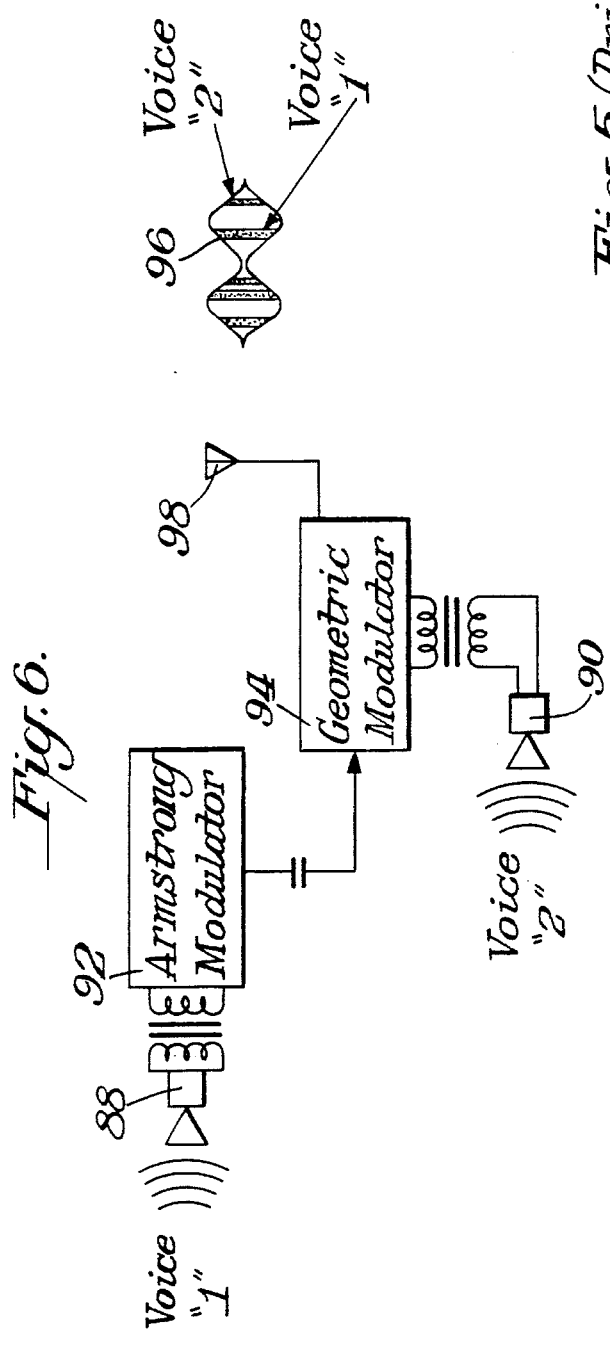
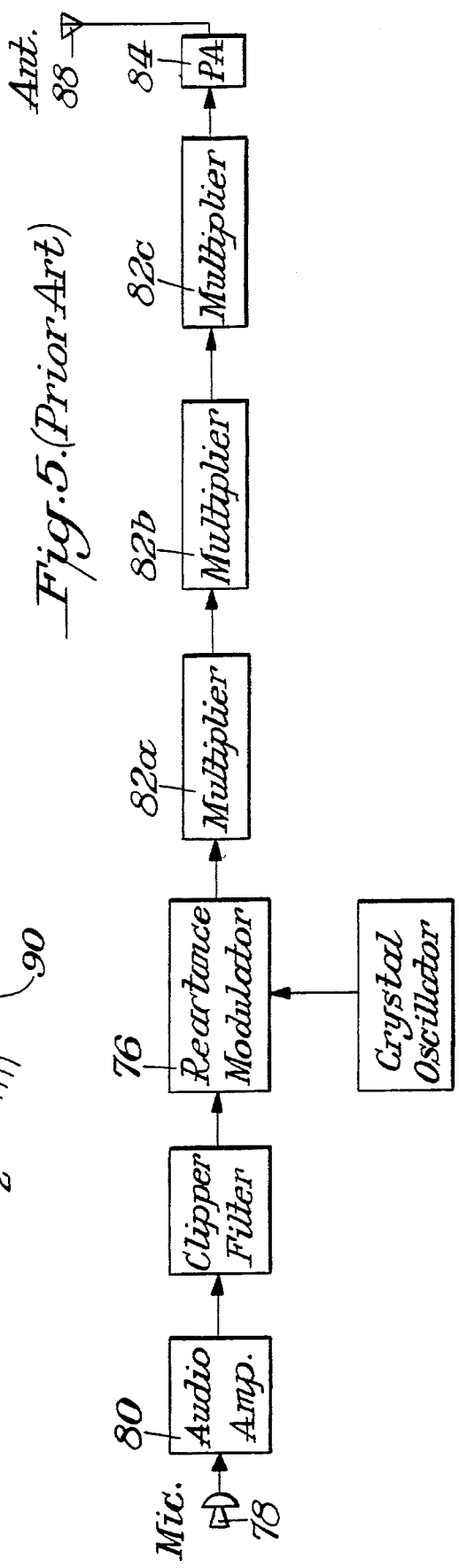

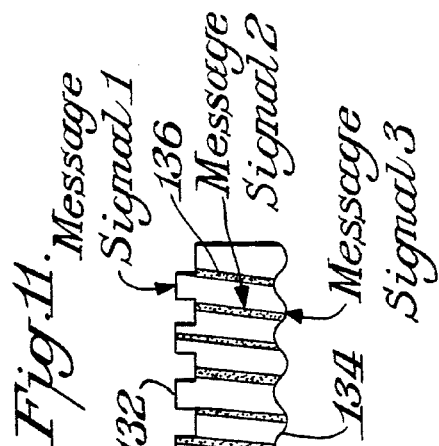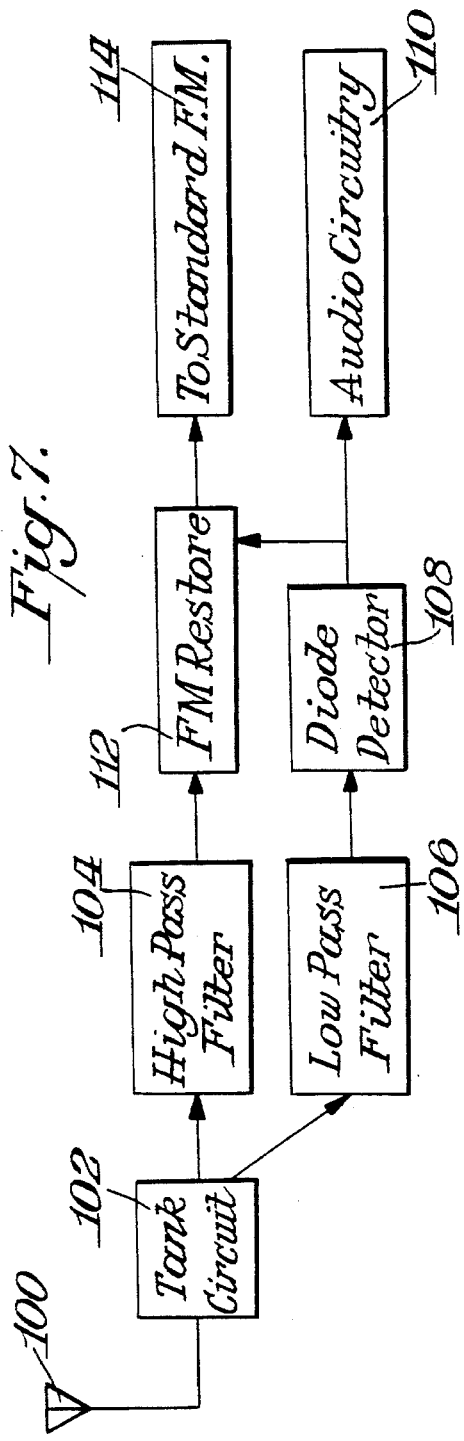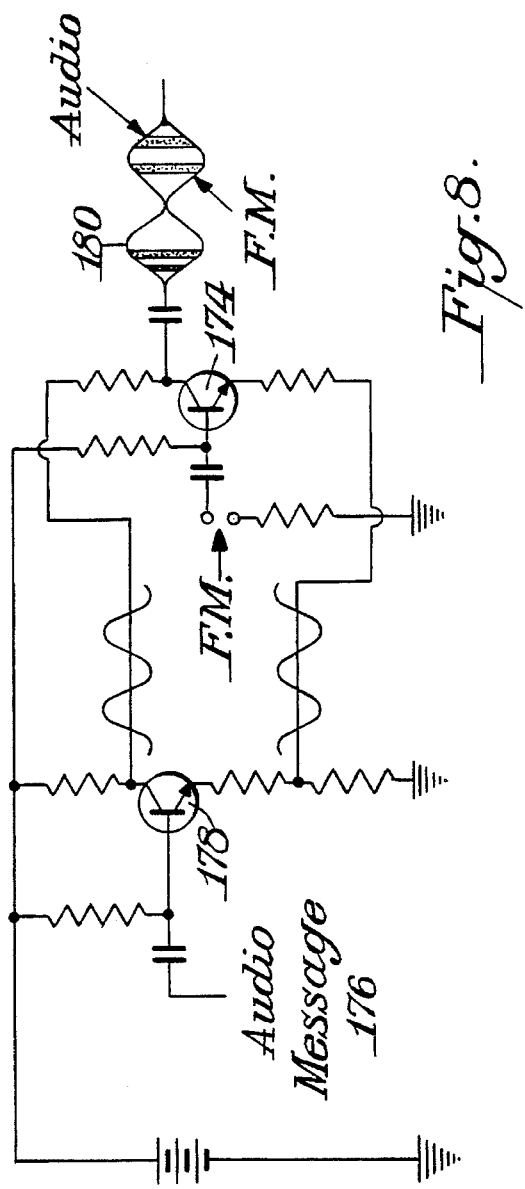

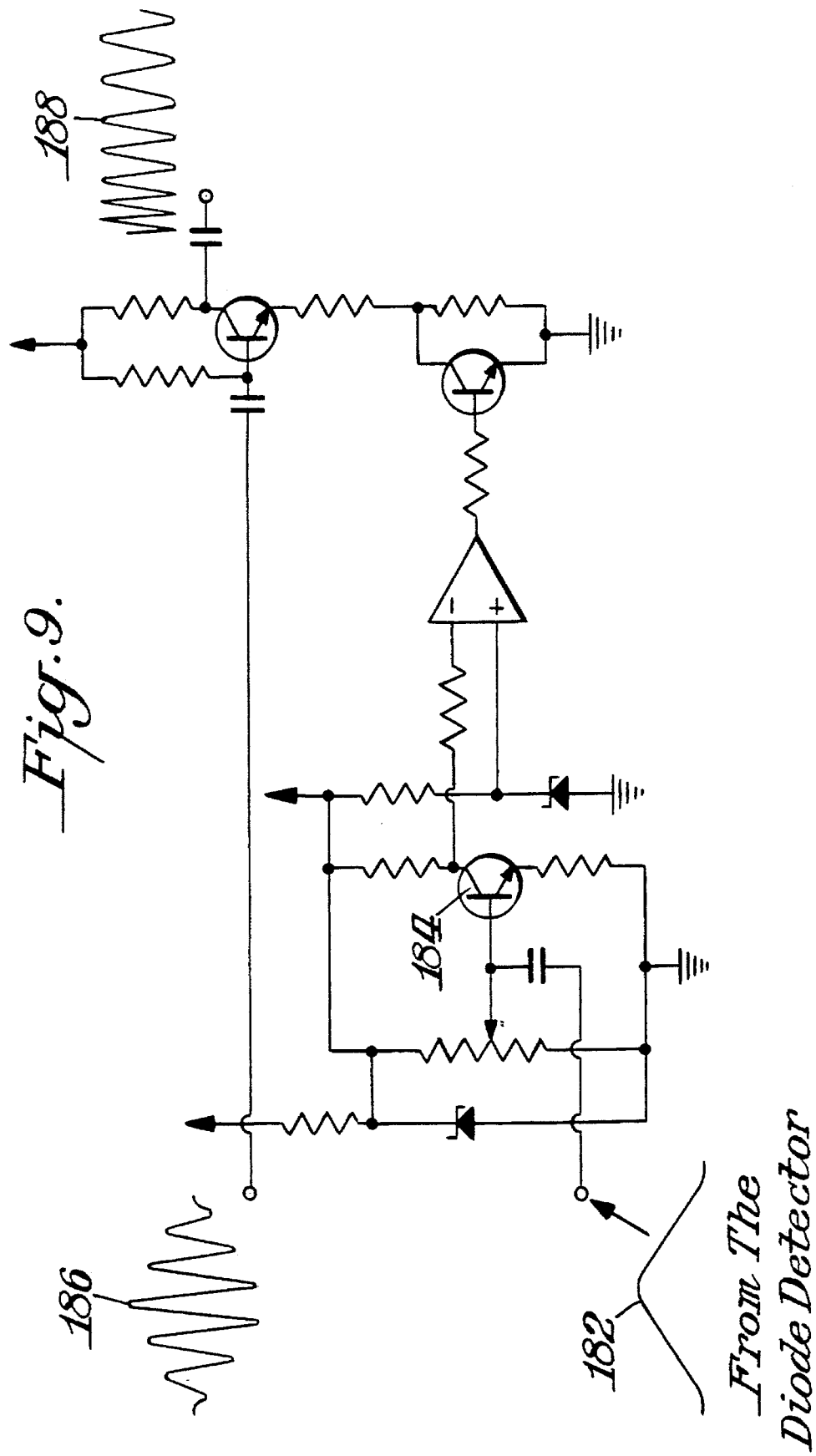

APPARATUS AND METHOD FOR GEOMETRICALLY MODULATING ELECTROMAGNETIC RADIATION AND A RECEIVER FOR DECODING GEOMETRICALLY MODULATED SIGNALS

BACKGROUND OF THE INVENTION

1. Field of the Invention

This invention relates to an apparatus and method for geometrically modifying electromagnetic radiation, and more particularly concerns modulation generated by a signaling power supply and a receiver for decoding geometrically modulated signals.

2. Description of the Prior Art

Radio waves are electromagnetic radiation over a defined frequency range. That part of the electromagnetic spectrum used for all forms of communication is commonly referred to as the radio spectrum.

The radio spectrum spans low frequency waves (under 10 kilohertz with a length of several kilometers) to very high frequency waves (300 gigahertz, with a length of around 1 millimeter).

The radio spectrum is considered to be a limited natural resource, and is in many instances overcrowded and subject to interference from a variety of electromagnetic transmitters competing for limited space.

Several transmission systems have been in practical use for many decades, among them continuous-wave unmodulated (CW), and various amplitude modulated (AM) and frequency modulated (FM) transmission systems. More recently developed is the so called "double modulation", or AM with pulse-width modulation Continuous-wave unmodulated radio signals are those used worldwide by amateur radio enthusiasts and others. This simplest of transmitters consists of a crystal oscillator and a variable frequency oscillator which provide a stable frequency. The power supply drives the oscillator, which emits an unmodulated carrier wave at a selected frequency. This signal may be alternatively connected or disconnected by a standard telegraph key, and sent through an amplifier and antenna. This, in essence, is a Morse-code transmitter.

AM and FM transmitters "modulate" a radio signal or carrier by changing a particular characteristic of the radio signal, either its amplitude by constructive or destructive interference with a lower frequency signal, or its frequency by electronic manipulation.

AM SYSTEMS

AM systems work by varying the amplitude of an RF signal in response to data input such as a microphone or audio input. Amplitude modulation is the result of the algebraic summation of the partial sums consisting of the carrier signal and a message signal. The message signal is a lower-frequency (audio and the like) signal, while the carrier is a high frequency signal generated by an oscillator. When the two signals are superposed, they interfere either destructively or constructively, causing the phenomenon known as "beats". A receiver tuned to the appropriate frequency can interpret the beat frequency and decode the audio or other data output.

The addition does not take place in a medium, rather, it takes place in the electron stream between the cathode and anode, with the introduction of the modulating signals at the grids of a traditional vacuum tube. When this modulation occurs in a transistor, it is at the P-N junction (solid state).

Amplitude modulation is a misnomer, it is better described as harmonic rearrangement, wherein the amplitude is varied by changing the harmonic content.

This traditional modulation is represented by the following equations, which equations are provided to explain the theoretical basis for traditional amplitude modulation to assist in further understanding of the applicant's invention only, and are in no way deemed to be limitations of the invention.

The first equation represents the addition of two electromagnetic waves in a vacuum tube. This summing is brought about by the thermonic work function:

$$\epsilon = \sqrt{\sigma KT(A^{2^2} - A^{2^1}) - \left(\frac{A_1}{A_2}\right)^2 \phi^2(X)}$$

Providing the energy function for the summation of the waves:

$$\Psi_1 = A_1 e^{i\omega_1 t}$$

and $$\Psi_2 = A_2 e^{i\omega_2}$$

with scattering angle "$\theta t$", $\delta = e^{i\theta t}$, and scattering parameter "$\delta$"

$$\beta \psi_1 + \psi_2 = \Psi = A_1 e^{i(\omega_1 + \theta)t} + A_2 e^{i\omega_2 t} \pm$$

$$\sqrt{\sigma KT(A^{2^2} - A^{2^1}) - \left(\frac{A_1}{A_2}\right)^2 \phi^2(X)}$$

Changing the harmonic content of the waves enables the amplitudes to become equal, minimizing the energy and changing the work function to $$\epsilon = \pm i\phi(x)$$

where "x" is the paramagnetic susceptibility. The basic summation is given by:

$$\psi = A_1 e^{i(\omega_1 + \theta)t} + A_2 e^{i(\omega_2)t}$$

And wherein $A_1 = A_2 = A$ $$\psi = Ae^{i(\frac{\omega_1 + \omega_2 + \theta}{2})t} \{e^{i(\frac{\omega_1 - \omega_2 + \theta}{2})t} + e^{i(\frac{\omega_2 - \omega_1 - \theta}{2})t}\} \pm i\phi(x)$$

$$\psi = Ae^{i(\frac{\omega_1 + \omega_2 + \theta}{2})t} \{e^{i(\frac{\omega_1 - \omega_2 + \theta}{2})t} + e^{-i(\frac{\omega_1 - \omega_2 + \theta}{2})t}\} \pm i\phi(x)$$

$$\psi = Ae^{i(\frac{\omega_1 + \omega_2 + \theta}{2})t} \cos\left[\left(\frac{\omega_1 - \omega_2}{2}\right) + \frac{\omega}{2}\right] \pm i\phi(x)$$

$$\psi = 2A \left\{ \cos\left[\left(\frac{\omega_1 + \omega_2 + \theta}{2}\right)t\right] + \right.$$

$$\left. i\sin\left[\left(\frac{\omega_1 + \omega_2 + \theta}{2}\right)t\right] \right\} \cos\left[\left(\frac{\omega_1 - \omega_2 + \theta}{2}\right)t\right] \pm i\phi(x)$$

$$\psi =$$

-continued $$2A\left\{\cos\left[\left(\frac{\omega_1+\omega_2+\theta}{2}\right)t\right]\cos\left[\left(\frac{\omega_1-\omega_2+\theta}{2}\right)t\right]+\right.$$

$$\left. i\sin\left[\left(\frac{\omega_1+\omega_2+\theta}{2}\right)t\right]\cos\left[\left(\frac{\omega_1-\omega_2+\theta}{2}\right)t\right]\right\}\pm i\phi(x)$$

$$\psi=2A\left\{\frac{1}{2}\cos\left[\left(\frac{\omega_1+\omega_2}{2}-\frac{\omega_1-\omega_2}{2}\right)t\right]+\right.$$

$$\frac{1}{2}\cos\left(\frac{\omega_1+\omega_2}{2}+\frac{\omega_1-\omega_2}{2}+\theta\right)t\right]+$$

$$\left. i\sin\left[\left(\frac{\omega_1+\omega_2+\theta}{2}\right)t\right]\cos\left[\left(\frac{\omega_1-\omega_2+\theta}{2}\right)t\right]\right\}\pm i\phi(x)$$

$$\psi=A\{\cos((\overline{\omega}-\omega_\Delta)t)+\cos(\overline{\omega}+\omega_\Delta+\theta)\}+$$

$$iA\sin\left[\left(\overline{\omega}+\frac{\theta}{2}\right)t\right]\cos\left[\omega_\Delta+\frac{\theta}{2}\right)t\right]\pm i\phi(x)$$

$$\theta t = \pi - \alpha t$$

$$\psi=A\{\cos[(\overline{\omega}-\omega_\Delta)t]+\cos[(\overline{\omega}+\omega_\Delta+\alpha)t+\pi]\}+$$

$$iA\sin\left[\left(\overline{\omega}+\frac{\theta}{2}\right)t\right]\cos\left(\omega_\Delta+\frac{\theta}{2}\right)t\right]\pm i\phi(x)$$

$$\psi=A\{\cos[(\overline{\omega}-\omega_\Delta)t]-\cos[(\overline{\omega}-\omega_\Delta-\alpha)t]\}+$$

$$iA\sin\left[\left(\overline{\omega}+\frac{\theta}{2}\right)t\right]\cos\left(\omega_\Delta+\frac{\theta}{2}\right)t\right]\pm i\phi(x)$$

$$\psi=A\cos[(\overline{\omega}-\omega_\Delta)t]-A\cos[(\overline{\omega}+\omega_\Delta\alpha)t]+B\sin(\overline{\omega}t)+$$

$$iA\sin\left[\left(\overline{\omega}+\frac{\theta}{2}\right)t\right]\cos\left(\omega_\Delta+\frac{\theta}{2}\right)t\right]\pm i\phi(x)-B\sin(\overline{\omega}t)$$

The resulting modulated wave is therefore:

$$\psi=A\cos[(\overline{\omega}-\omega_\delta)t]+B\sin(\overline{\omega}t)-A\cos[(\overline{\omega}+\omega_\delta=\alpha)t]$$

and Snell's law applied:

$$i\left\{\frac{A\cos\left[\left(\omega_\delta+\frac{\omega}{2}\right)t\right]}{B}\pm\frac{\phi(x)}{\sin\left(\overline{\omega}+\frac{\theta}{2}\right)t}\right\}=\frac{\sin(\overline{\omega}t)}{\sin\left[\left(\overline{\omega}+\frac{\omega}{2}\right)t\right]}$$

Therefore, it may be seen that the resulting refractive index has a real component which is zero. This indicates that traditional amplitude modulation takes place in the electron stream (of the vacuum tube for this example).

The refractive index created in a P-N junction of a diamagnetic medium with diamagnetic dopants also exhibits a complex refractive index but whose real part is a function of the bonding of the material medium.

Traditionally, optics and radiocommunications are thought of as disjoint fields, however, the modulation of electromagnetic communications is an extension of the optical principles of reflection and refraction. The transition from a real non-complex geometric configuration to a viable resolution in terms of complex numbers can be assisted by an understanding of the following relationships.

Let $R_\epsilon$ and $I_m$ be abbreviations for the real part and the complex part of a complex number.

The vector z is the vector sum of x and y or z=x+y. The magnitude of z is given by $$z \cdot z = (x+y) \cdot (x+y)$$

or, more appropriately $$z^2 = x^2 + y^2 + 2xy \cos \theta_z$$

From the law of sines, which is $$\frac{x}{\sin\theta_x}=\frac{y}{\sin\theta_y}=\frac{z}{\sin\theta_z}$$

and substituting $$x=\frac{\sin\theta_x}{\sin\theta_y}y$$

into the equation, the following relationship is obtained:

$$z^2=\left(\frac{\sin\theta_x}{\sin\theta_y}\right)^2 y^2+y^2+2y^2\left(\frac{\sin\theta_x}{\sin\theta_y}\right)\cos\theta_z=$$

$$\left[\left(\frac{\sin\theta_x}{\sin\theta_y}\right)^2+2\left(\frac{\sin\theta_x}{\sin\theta_y}\right)^2+2\left(\frac{\sin\theta_x}{\sin\theta_y}\right)\right]\cos$$

substituting the identity $$\sin^2\theta_z+\cos^2\theta^2=1$$

yields the equation $$z^2=\left[\left(\frac{\sin\theta_x}{\sin\theta_y}\right)^2+2\left(\frac{\sin\theta_x}{\sin\theta_y}\right)\cos\theta_z+\cos^2\theta_z+\sin^2\theta_z\right]y^2$$

manipulating to yield $$z^2=\left\{\left[\frac{\sin\theta_x}{\sin\theta_y}\right)+\cos\theta_z\right]^2+\sin^2\theta_z\right\}y^2=$$

$$\left[\left(\frac{\sin\theta_x}{\sin\theta_y}\right)+\cos\theta_z\right]^2+y^2\sin^2\theta_z$$

substituting the relationship $$y=\left(\frac{\sin\theta_y}{\sin\theta_x}\right)x$$

yields the following:

$$z^2=x^2+\left(\frac{\sin\theta_y}{\sin\theta_x}\right)^2 x^2+2\left(\frac{\sin\theta_y}{\sin\theta_x}\right)x^2 soc\theta_z=$$

-continued $$\left[\left(\frac{\sin\theta_y}{\sin\theta_x}\right)^2 + 2(\sin\theta_y\sin\theta_x)\cos\theta_z + 1\right]x^2$$

substituting in the identity $$\sin^2\theta_z + \cos^2\theta_z = 1$$

gives $$z^2 + \left[\left(\frac{\sin\theta_y}{\sin\theta_x}\right)^2 + \left(\frac{\sin\theta_y}{\sin\theta_x}\right)\cos\theta_z + \cos^2\theta_z + \sin^2\theta_z\right]x^2$$

$$z^2 = \left[\left(\frac{\sin\theta_y}{\sin\theta_x}\right) + \cos\theta_z\right]^2 x^2 + x^2\sin^2\theta_z$$

$$\left[\left(\frac{\sin\theta_y}{\sin\theta_x}\right) + \cos\theta_z\right]^2 x^2 + x^2\sin^2\theta_z =$$

$$\left[\left(\frac{\sin\theta_x}{\sin\theta_y}\right) + \cos\theta_z\right]^2 y^2 + y^2\sin^2\theta_z$$

$$\left[\left(\frac{\sin\theta_y}{\sin\theta_x}\right) + \cos\theta_z\right]^2 x^2 - y^2\sin^2\theta_z =$$

$$\left[\left(\frac{\sin\theta_x}{\sin\theta_y}\right) + \cos\theta_z\right]^2 y^2 - x^2\sin^2\theta_z$$

The above equation would be true for all values of x and y if:

$$\left[\left(\frac{\sin\theta_y}{\sin\theta_x}\right) + \cos\theta_z\right]^2 = -\sin^2\theta_z$$

$$\frac{\sin\theta_y}{\sin\theta_x} + \cos\theta_z = i\sin\theta_z$$

$$\cos\theta_z + i\sin\theta_z = -\frac{\sin\theta_y}{\sin\theta_x}$$

since $\Theta_x + \Theta_y + \Theta_z = \pi$; $\cos(\pi - A) = -\cos A$; $\Theta_z = \pi - (\Theta_x + \Theta_y)$; and $\sin(\pi - A) = \sin A$, $$\cos(\pi - (\theta_x + \theta_y)) - i\sin(\pi - (\theta_x + \theta_y)) =$$

$$-\cos(\theta_x + \theta_y) - i\sin(\theta_x + \theta_y) = -\frac{\sin\theta_y}{\sin\theta_x}$$

Reducing in the following steps:

$$e^{i(\theta_x+\theta_y)} = \cos(\theta_x + \theta_y) + i\sin(\theta_x + \theta_y) = \frac{\sin\theta_x}{\sin\theta_y}$$

$$\left[\frac{\sin\theta_x}{\sin\theta_y} + \cos\theta_z\right]^2 = -\sin^2\theta_z = \left[\cos\theta_z + \left(\frac{\sin\theta_x}{\sin\theta_y}\right)\right]^2$$

$$\cos\theta^2 + \left(\frac{\sin\theta_x}{\sin\theta_Y}\right) = -\sin\theta_z - \cos\theta_z - i\sin\theta_z = \frac{\sin\theta_x}{\sin\theta_y} -$$

$$\cos[\pi - (\theta_x + \theta_y)] - i\sin[\pi - (\theta_x + \theta_y)] = \frac{\sin\theta_x}{\sin\theta_y} +$$

-continued $$\cos(\theta_x + \theta_y) - i\sin(\theta_x + \theta_y) = \frac{\sin\theta_x}{\sin\theta_y}$$

$$e^{-i(\theta_x+\theta_y)} = \cos(\theta_x + \theta_y) - i\sin(\theta_x + \theta_y) = \frac{\sin\theta_x}{\sin\theta_y}$$

As can be seen by the above relationships, traditional AM modulation is the act of modifying the amplitude of one continuous wave signal to conform to the amplitude of a second continuous wave signal by changing the harmonic content of the wave.

Again, this occurs in the electron stream of a vacuum tube, which exhibits a complex refractive index whose real component is zero, or a P-N junction in a semiconductor device whose materials have diamagnetic susceptibility and also exhibits a complex refractive index. No circuitry controls the interference with the two waves, and the geometry is that of continuous waves.

This modulation is a constructive or destructive interference brought about by the summation of continuous electromagnetic waves scattered from a wave front collision point.

Other forms of modulation do not depend on the material parameters, i.e. the refractive index or the paramagnetic or diamagnetic susceptibility. The modulation encountered in FM and other forms is a direct function of circuit elements such as a balanced modulator, filter, diode, etc. This difference requires recognition that the modulation process proceeds by virtue of discrete circuits constructed specifically to produce that form of modulation, and not from an interference phenomenon.

There are at least three other forms of modulation which utilize combinations of amplitude modulation with other circuit generated modulation. Narrow band FM, also called inverted AM lower sideband, is a mixture of AM modulation, dependent upon wavefront collisions of continuous waves in a P-N junction and electron stream, but governed by a filter, inverter, and balanced modulator. It is an amplitude modulated wave, with an artificially (by a circuit) inverted lower sideband summed with the carrier frequency and upper sideband. The signal has higher noise immunity than the pure AM signal, although no additional data is added by this modulation.

Independent side band, also called "AM sideband manipulation" is also a mixture of AM modulation, and dependent upon wavefront collisions of continuous waves in a P-N junction and electron stream, but governed by a filter, and balanced modulator. In this instance, the carrier is diminished, and the sidebands carry the data signal. No additional data is added by this modulation.

Double modulation is commonly used in the communications industry. Double modulation first gained acceptance in the television industry for color television transmissions, followed by stereo FM, and later high-quality AM. Such modulation is carried out by first converting an amplitude varying message signal into a square wave whose duty cycle changes in proportion to the amplitude of the message signal. Among such double modulators are pulse width modulators.

In a pulse-width double modulator, a square wave is first generated, said square wave being applied to an integrator to produce a triangle wave. The triangle wave is then added to a sinusoidal message signal to produce a sinusoidally varying triangle wave which is the sum of the two waves. The sinusoidally varying triangle wave is then compared to a DC reference voltage in a comparator, and the comparator outputs a square waveform. This outputted square waveform is used in a high-level modulator to amplitude modulate the carrier signal of the AM transmission. No additional data is added by this additional modulation.

FM SYSTEMS

In an FM system, the carrier frequency is modulated by voltage fluctuations which represent data, usually voice, to be transmitted. As the voltage fluctuates, the carrier frequency changes in a fixed proportion to the voltage. This is also called "direct FM".

This modulation differs from AM in that it does not depend on wavefront collisions, i.e. is not dependent on the material environment. The modulation is achieved by a voltage controlled oscillating circuit.

Phase modulation, like FM occurs as a result of electronic manipulation, i.e, not as the result of a wavefront collision. It occurs in a balanced modulator, utilizing a phase delay and summing amplifier. Phase modulation is sometimes called "indirect FM" and improves frequency stability by modulating the frequency after the oscillator creates the carrier frequency. This reduces drift or instability arising from frequency multiplying stages.

Pulse amplitude modulation is also independent of wavefront collisions, and mixes a sine wave message signal nonlinearly with a low-duty cycle sine wave in an analog switch environment, i.e. a P-N or electron stream. A pulse amplitude converts a simple analog sine wave to a rectangular wave pulse. This is a "pure" circuit manipulation of the signal.

In pulse width modulation, no wavefront collisions are involved, and a summing amplifier controls the modulation, resulting in rectilinear pulses.

In pulse position modulation, no wavefront collisions are involved, and a pulse width modulator and timer control the modulation, resulting in square waves.

RECEIVERS

Receivers change radio-frequency signals to audio or data output signals which may be perceived or multiplied. The earliest AM receivers, generally, worked by an AM radio signal causing a current to flow in an antenna. A diode rectified the RF signals, while a capacitor defined the envelope waveform. This envelope waveform passed through the circuit as an audio signal.

Direct conversion receivers are slightly more complex AM receivers as are superheterodyne receivers for CW and SSB (single-side band) carrier. In direct conversion receivers, an incoming signal is combined with a signal generated by an internal variable-frequency oscillator. Various frequencies (including the sum and difference of the incoming and internal frequency) are generated. By manipulating the frequencies, one of the resulting frequencies is in the audible range, and can be amplified by an audio amplifier.

Superheterodyne receivers add an additional mixer to direct conversion receiver. The first mixer converts the incoming frequency to an intermediate frequency, and the remaining electronic components in the receiver are designed to be most efficient at this intermediate frequency.

FM receivers are designed in a similar manner as AM receivers, except the data detector is geared to the frequency shifts of the FM signal or phase modulated signal.

Standard FM receivers are designed to be insensitive to amplitude variation caused by an impulse-type noise. See for example, the ARRL License Manual (Available from the American Radio Relay League, Newington, Conn. 06111), Technician's Class, copyright 1989, pages 8–3 to 8–4, for an excellent summary of this feature.

Stereo FM transmission is somewhat more complex than monaural FM transmission. A stereo signal consists of a left and right audio frequency signal, which are added in linear adders. One signal is inverted in one of the adders, resulting in an audio signal which is phase shifted 180°. The common way of performing this in the art is to phase shift the right audio signal, and add the right audio signal in unshifted form in one linear adder to the left audio signal (L+R), and again add the right audio signal in shifted form to the left audio signal in another linear adder (L–R).

The shifted audio added signal is amplitude modulated onto an FM carrier in a balanced modulator which suppresses the voltage at the carrier frequency and shifts the frequency of the L+R audio signal. The L–R audio signal is added to the double modulated L+R signal. This signal then may be broadcast, with a pilot or reference signal for demodulating the signal.

Stereo signals are decoded in the reverse manner of their encoding. The signal is received and split by means of a low pass filter to the L+R signal and the modulated L–R signal. After demodulation of the L–R signal, the outputs to the left and right channels are separated, or if the receiver is monaural, the L+R signal is directly fed to the speaker. By combining the two signals after selective rectification, the left and right audio signals may be filtered and amplified. No data is added, rather left and right signals are combined.

With the large number of AM, FM, TV, satellite, and cellular communications now in service, the shrinkage of frequency space has become problematic. At present, there are approximately 100 FM stations available on the spectrum. About 20 of these are reserved for educational or nonprofit broadcast, and about 80 are for commercial broadcast service. In many areas, the frequency spectrum is full, and no more broadcast licenses can be issued.

One method of conserving bandspace which has developed is known as time-division multiplexing. Utilizing a digitalized audio input, (a pulse amplitude modulated wave), a series of flat-top square waves replaced the sinusoidal information wave. These flat-topped square waves are low-duty square waves, leaving the system inactive for up to 80% of the time.

The number of square waves required to adequately sample an audio sinusoidal wave is two times the highest analog frequency. This minimum number of samplings is far lower than that the pulse-amplitude modulated system is capable of supporting with no loss in fidelity of the signal transmitted. Thus, a time-division multiplexer can sample up to 8 and possibly more audio-type waves (depending on the message signal frequency) in a clocked sequence, and then reconstruct the full waves at the receiver end by use of a low pass filter integrator. The bandwidth required is the same as for a single signal, due to the periods of non-use of the square waves. Such a system requires intricate timing circuitry and synchronization pulses to ensure appropriate encoding and decoding. *Electronic Communications, Modulation and Transmission*, Second Edition, J. Schoenbeck, McMillan Publishing Co, New York, N.Y., 1992, provides a thorough background on the prior modulation techniques and is incorporated herein by reference.

Other proposals have been made to "piggyback" data onto already existing pathways. DePaul, in U.S. Pat. No. 4,783, 699 developed a method of allowing additional information to be transmitted in a video signal. His method allowed a different form of electronic intelligence to use a preexisting pathway by amplitude modulating the horizontal synchronization pulses of a television signal. This allows the simultaneous transmission of text. However, it does not increase the available data transmission capabilities, rather, it makes existing ones more efficient by effectively using dead portions when no information would normally be transmitted.

Each of the foregoing modulation techniques, while effective for transmission purposes, suffer from the problems associated with shrinking radio frequency availability—to transmit more data as a separate data channel, more bandwidth is required. Additionally, data transmission along cable routes such as electric (copper) telephonic cables or fiber optic cables is becoming congested as the vast amounts of data transmitted grows. Dedicated satellite channels, on all frequencies including microwaves, are in great demand and extremely expensive. A solution to this most pressing problem is urgently required.

SUMMARY OF THE INVENTION

It is an object of the present invention to provide an apparatus which can increase the data transmission capability of an electromagnetic signal by appending at least one message signal through geometric waveform modulation without requiring cost-prohibitive additional equipment and increased complexity, or increasing the bandwidth.

In a presently preferred embodiment of the invention, two additional data channels are provided. It is also an object of this invention to enable simultaneous transmission of both data in digital form and analog signals. It is also an object of the present invention to provide a receiver capable of decoding the geometrically modulated waveform. Finally, it is an object of the present invention to provide a new form of modulation.

These and other objects are accomplished by the method and apparatus of the present invention.

The invention comprises an apparatus capable of producing a geometrically-modulated electromagnetic radio frequency signal, and a receiver capable of decoding the data signal and all additional signals transmitted. The novel signal and data combination of the present invention is heretofore unknown in the art.

Geometric modulation also is heretofore unknown, and is described in theory in some detail as follows. As discussed above, the existing forms of modulation occur with varying degrees of human manipulation into the natural interference phenomenon known as "beats" occurring in traditional AM. This human manipulation occurs to the extent of removing the natural interference phenomenon and artificially modulating, as in FM.

Modulation as presently understood can be divided into a continuum ranging from AM, which is strictly wave-dependent, to pure digital modulation, which is a "forced" modulation arising from strictly controlled circuit construction.

The newly developed modulation, the subject of the present application, is termed "geometric modulation". It does not depend on wavefront collisions, although the geometry of the waveforms is crucial to the final modulation of the wave. The circuitry which controls the waveform modulation is a signaling power supply.

The signaling power supply generates both positive and negative voltage variations, representing and reproducing a message signal, which could be a wave train or a digitalized input. The signaling power supply may be symmetric or non-symmetric, and may be an audio or other input, limited only by its relation to the carrier wave frequency. The signaling power supply is a power supply that varies at an information rate, varying the amplitude of the primary carrier wave.

A non-symmetric signaling power supply generates a waveform (wherein the upper waveform differs from the lower waveform) which enables different types and channels of information to be carried. A symmetric power supply utilizes the same input, shifts it 90° out of phase from the upper envelope to the lower envelope, while in the asymmetric signaling power supply the upper envelope may have no relationship with the lower envelope.

Utilizing a signaling power supply increases the information which may be contained in an electromagnetic transmission by a factor of three, utilizing the applicant's novel geometric modulation. The output wave of a geometrically modulated wave will have the internal wave frequency as one data signal, and the outer upper and lower waveforms as second and tertiary data signals. These additional data signals are transmitted without increasing the bandwidth and at no appreciable loss of signal quality.

Geometric modulation represents a radical departure from standard amplitude modulation. A geometric modulator utilizes a controllable asymmetric or symmetric power supply. The power supply is a power source whose voltage is able to fluctuate at an information or signal-rate frequency. This voltage variation emulates the physical appearance of a modulated wave, without actually being one. Thus, no interference phenomenon is generated which would effect the internal harmonic frequency.

A geometrically modulated waveform is surrounded by an imaginary envelope which is simulated by a relatively slow amplitude variation generated by the signaling power supply in the geometric modulator.

This geometrically modulated waveform is a departure from conventional modulation of amplitude, which utilizes the "beat" phenomenon occurring when two waveforms are superposed. The signaling power supply is regulated by the data inputted into the geometric modulator. Thus, the geometric modulator allows at least one additional independent data channel where before there was only one in the FM transmitter. As the waveform has an upper and a lower half, an asymmetric power supply may transmit at least two additional data channels.

The receiver, a critical component to the success of this modulation form, must not interfere with the harmonic content of the underlying carrier radiation. The primary constituent of the tuning section of the receiver is a filter circuit which "strips" away modulation.

As applicant presently understands the electronic theory, and offering the following discussion only by way of explanation, and not limitation, the energy losses induced by the filter circuit are convertible into a complex number, represented by a transfer function, a mathematical equation generated by Laplace transformation.

From this complex number, it may be determined whether a selected filter circuit will harm the harmonic content of the incoming wave. Filter performance is measured by the signal losses as a function of frequency, phase shift, and group delay.

Group delay is a parameter which measures the aberration induced by the filter on the harmonic content of the input wave. The group delay is represented by the following equation:

$$\gamma(\theta) = -\frac{\partial \theta(\omega)}{\partial \omega}$$

where $\Theta(\omega)$ is the phase shift of the filter in this equation. The transfer function, for a filter circuit, is generated by first making a circuit diagram and replacing the circuit elements with their mathematical analogues.

The mathematical analogues are as follows:

For an inductor, the voltage drop of an inductor of inductance L, with current I, is:

$$\text{VoltageDrop} = L\left(\frac{\partial I}{\partial t}\right)$$

For a capacitor of charge "q", the voltage drop across the capacitor is:

$$V = \frac{q}{c}$$

Naturally, the voltage drop across a resistor of resistance R is V=I R, or Ohm's law.

The Laplace transformation is defined as:

$$\partial[F(t)] = \int_0^\infty e^{-\delta t} F(t) \partial t$$

The following definitions are used in computing the Laplace transformations:

$\mathscr{L}[E_{into}]=V_{in}$; $\mathscr{L}[q]=Q$ $\mathscr{L}[i]=\delta Q$; and $\mathscr{L}[E_{out}]=V_{out}$.

Considering the filter circuit of a capacitor of capacitance C, in series connection with an inductor of $I_1$ and $i_2$ parallel to a resistor of resistance R, the overall circuit having a voltage $e_{out}$, we note the following values from Kirkoff's laws:

$$E_\epsilon = \frac{q_1}{C} + L\frac{\partial i_1}{\partial t} - L\frac{\partial i_2}{\partial t}$$

$$0 = L\left(\frac{\partial i_2}{\partial t} - \frac{\partial i_1}{\partial t}\right) + i_2 R$$

taking Laplace transformations of the above equations, we see that:

$$\mathscr{L}[E_{into}] = \frac{\mathscr{L}[q_1]}{C} + L\mathscr{L}\left[\frac{\partial C_1}{\partial t}\right] - L\mathscr{L}\left[\frac{\partial i_2}{\partial t}\right]$$

and $$V_{into} = \frac{Q_1}{C} + LSI_1 - LSI_2 = \frac{I_1}{SC} + LSI_1 - LSI_2$$

taking Laplace transformations of the second equation, $$\mathscr{L}[0] = \mathscr{L}\left[\frac{\partial i_2}{\partial t}\right] + \mathscr{L}\left[\frac{\partial i_1}{\partial t}\right] + R\mathscr{L}[i_2]$$

$$0 = LSI_2 - LSI_1 + RI_2$$

$$\frac{I_1}{SC} + LSI_1 = V_{into}$$

$$(LS + R)I_2 - LSI_1 = 0$$

$$I_2 = \frac{S^2 CLV_{into}}{(RLC)S^2 + LS + RC}$$

$$\frac{V_{out}}{V_{into}} = \frac{(CLR)S^2}{(RLC)S^2 + LS + RC}$$

$$\frac{V_{into}}{V_{out}} = \text{loss characteristic} = \frac{(RLC)S^2 + LS + RC}{(RLC)S^2}$$

$$\frac{V_{into}}{V_{out}} = \text{the transfer function} = \frac{(CLR)S^2}{(RLC)S^2 + LS + RC}$$

s=j $\omega$, and J= the square root of negative 1.
Therefore $$H(\omega) = \frac{-(CLR)\omega^2}{-(CLR)\omega^2 + j\omega L + RC} = \frac{(-CLR)\omega^2}{(RC - CLR\omega^2) + L\omega j}$$

$$\tan\theta(\omega) = \frac{L\omega}{RC - CLR\omega^2}$$

$$\theta(\omega) = 0 = \tan^{-1}\left(\frac{L\omega}{RC - CLR\omega^2}\right)$$

The above relationship indicates a relationship between the phase angle and the frequency, while this relationship for this circuit indicates significant harmonic damage to the underlying frequency.

Ideally, the phase angle should not be a function of the frequency, but if a functional relationship does exist, it should be a linear function to avoid harmonic damage. The complex plane may be depicted as a "Wessel" plot. If the imaginary part of the complex number is zero, then tan $\theta$=0, and the number is real. This would be the result for a filter which does not damage the harmonic content of the input wave.

The Bessel function $$J_0(s) = 1 - \frac{s^2}{2^2} + \frac{s^4}{2^2 - 4^2} - \frac{s^4}{2^2 - 4^2 - 6}$$

for s=j $\omega$, $$J_0(j\omega) = 1 + \frac{\omega^2}{2^2} + \frac{\omega^4}{2^2 - 4^4} + \frac{\omega^6}{2^2 - 4^4 - 6^6}$$

would generate a real number, where $\theta(\omega)$=0 in the complex plane.

In summary, the only type of filter which will decode a geometrically modulated waveform without damaging the harmonic content is a filter with a transfer function having all even-numbered exponents.

A more complete understanding of the invention may be had by reference to the following figures and their descriptions in conjunction with the respective waveforms and algebraic or geometric equations.

BRIEF DESCRIPTION OF THE DRAWINGS

FIG. 3 is a step-block diagram of a conventional FM transmitter;

FIG. 3a is a graphical representation of a sinusoidal carrier wave;

FIG. 3b is a graphical representation of a sinusoidal modulating data signal;

FIG. 3c is a graphical representation of a frequency-modulated carrier wave;

FIG. 5 is a step-black diagram of a conventional PM transmitter;

FIG. 6 is a step-block diagram of a transmitter apparatus constructed in accordance with the present invention;

FIG. 7 is a step block diagram of a receiver apparatus constructed in accordance with the present invention;

FIG. 8 is an electronic schematic of a signaling power supply according to the present invention;

FIG. 9 is an electronic schematic of FM restore circuitry (the geometric decoder) constructed in accordance with the present invention;

FIG. 11 is a graphical representation of a waveform generated by a preferred embodiment of the present invention;

DETAILED DESCRIPTION OF THE DRAWINGS

Figure 1:
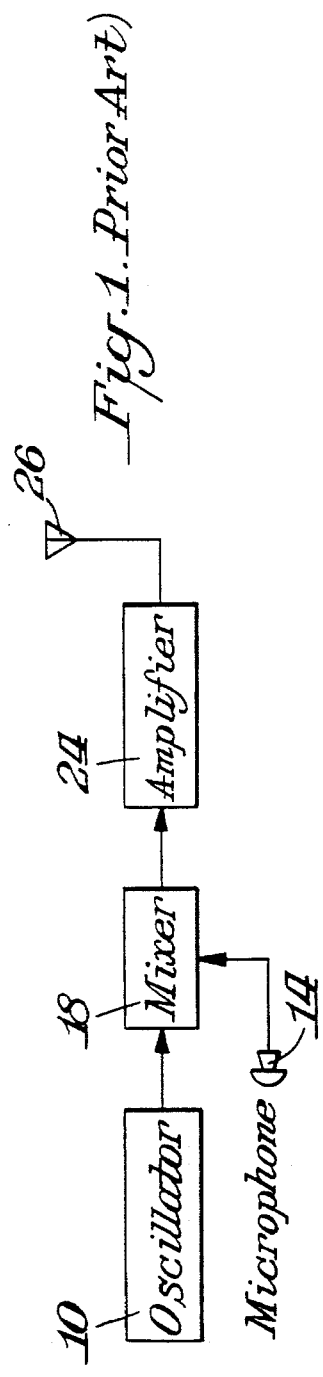
FIG. 1 is a step-block diagram of conventional AM transmitter.
Figure 1A:
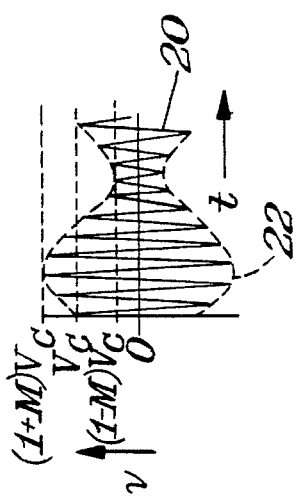
FIG. 1a is a graphic representation of a sinusoidal carrier wave.
Figure 1B:
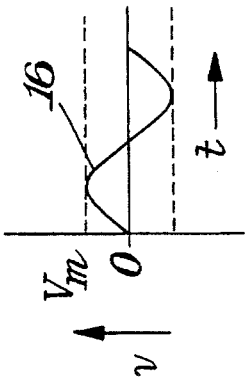
FIG. 1b is a graphical representation of a sinusoidal modulating data signal.
Figure 1C:
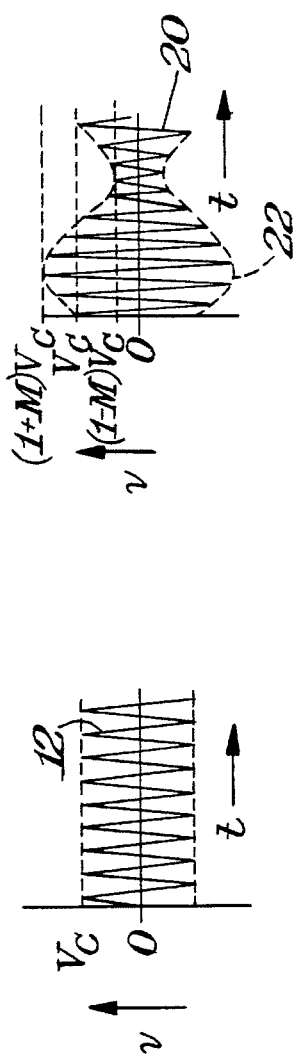
FIG. 1c is a graphical representation of an amplitude modulated carrier wave.

FIG. 1 is a step block diagram of a standard AM transmitter, the oscillator 10 generates the standard sine waveform 12 (of FIG. 1A) of a given frequency, with voltage plotted on the vertical axis against time on the horizontal axis. A microphone 14 or other data input apparatus generates modulating signal 16, with the signal shown in FIG. 1b, with voltage fluctuation plotted against time. The two signals are mixed in a mixer 18 creating a traditional amplitude-modulated signal 20 having a true envelope 22. This signal is then amplified by amplifier 24, and transmitted through antenna 26.

This modulation is a direct result of the natural interference phenomenon, and the waveform envelope 22 is the result of the "beat" phenomenon.

Figures 2, 4:
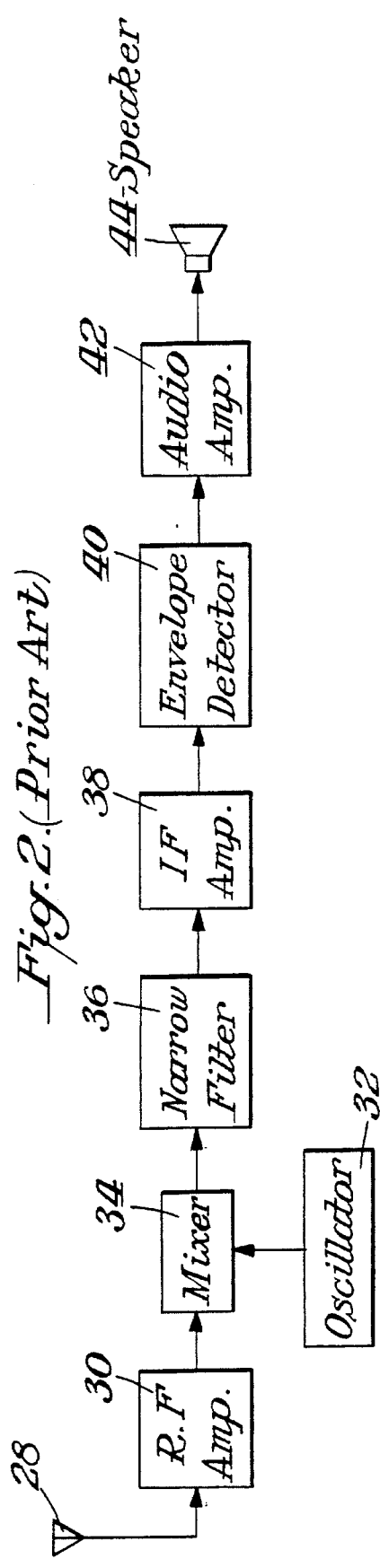
FIG. 2 is a step-block diagram of a conventional AM receiver.
FIG. 4 is a step-black diagram of a conventional FM receiver.

FIG. 2 depicts a step block diagram of a standard AM receiver. The signal is received in antenna 28, and is sent to amplifier 30. The oscillator 32 generates a sinusoidal wave of variable frequency, which is mixed with the incoming amplified signal in mixer 34. The resulting frequency spectrum generated is filtered through narrow filter 36, and the resulting "selected" frequency (known as an "intermediate frequency") is amplified in IF (intermediate frequency) amplifier 38. The frequency is then passed through an envelope decoder 40, which is usually a rectifier circuit containing a capacitor.

The amplitude modulated signal is rectified by a diode so that only the upper waveforms are present. The capacitor acts to smooth out the waveform, transforming the AM signal into the modulating wave. This modulating wave is the transmitted data, which may be amplified by an audio amplifier 42 and played through speaker 44 or otherwise manipulated.

FIG. 3 is a step block diagram of a simple FM transmitter. Data is inputted at microphone or other apparatus 46, and the data is transformed into sinusoidal wave 48, as shown in FIG. 3b. An oscillator 50 generates a sinusoidal base carrier wave 52 at a selected rest frequency. The oscillator is controlled by a resonant circuit in the feedback path of the oscillator. As the modulating signal voltage rises and falls, the carrier frequency changes in proportion or inverse proportion to the voltage, resulting in a frequency-modulated signal 54 as shown in FIG. 3c. This signal, also known as indirect FM, is formed by pure electronic manipulation, relying not at all upon natural interference phenomena.

FIG. 4 is a step-block diagram of a standard FM receiver. The frequency modulated signal 54 is received at antenna 56, and amplified at amplifier 58. Internal oscillator 60 generates a selected frequency which is mixed in mixer 62 to cause constructive or destructive interference and generate an intermediate frequency. This frequency is filtered through wide filter 64, and amplified in amplifier 66. Limiter 68 eliminates any amplitude fluctuations, and frequency discriminator 70 detects frequency shifts, converting these shifts in the FM signal into a low-frequency data or audio signal, which is amplified in amplifier 72 and may be played in speaker 74, if the data is an audio signal.

FIG. 5 shows a standard phase-modulated transmitter. Phase-modulated transmission is similar to FM transmission, with the exception that the modulation occurs after the oscillator stage. That is, the oscillator does not shift, but a reactance modulator 76 changes the capacitance or inductance of a resonant circuit in response to an input signal (audio or data) from microphone or other apparatus 78 which is amplified in amplifier 80. This alters the carrier frequency.

The frequency may then be multiplied by frequency multiplier 82(a–c), and amplified in amplifier 84 to be broadcast from antenna 86. The signal may be received on an FM receiver similar to that depicted in FIG. 4.

FIG. 6 is a partial step block diagram of a transmitter embodiment of the present invention. The first input signal is denoted by reference numeral 88. This data may be audio, or other electronic sinusoidal or digital input. The second input signal is denoted by reference numeral 90, and may also be any other form of data, including digital or binary coded information. This input signal may also be square or triangular (isosceles or right triangle) waves.

Armstrong modulator 92 processes the first input signal into a conventional FM signal. A higher rest frequency signal may also be used, including microwave and optical frequencies. Geometric modulator 94 (a symmetric geometric modulator) receives second input signal 90, and arranges the waveform by geometric modulation to obtain waveform 96, containing the two input data signals. The modulated waveform may be broadcast through antenna 98. The waveform may also be transmitted through data cables or fiber optic cables.

FIG. 7 is a step-block diagram of an embodiment of a receiver according to the present invention. The geometrically modulated waveform is received at antenna 100, where it is transferred to a tank circuit 102 for amplification and splitting. The signal is sent in parallel to a high pass filter 104 and a low pass filter 106. After passing the low pass filter, the low-frequency geometrically modulating input signal 90, from FIG. 6 is detected at diode detector 108, and may be amplified or decoded in the audio circuitry 110. Other circuits may be used to manipulate this signal as well, not merely as an audio signal.

Diode detector 108 also concurrently sends a signal to the FM restore circuitry 112, which reverts the geometrically modulated FM signal to a standard FM signal 114 of unvarying amplitude envelope.

FIG. 8 is a electronic schematic of an example of a symmetric signaling power supply which may be used to geometrically modulate an FM signal. A frequency modulated wave (FM) is supplied to the base of transistor 174. Audio message 176 is geometrically appended through splitter 178, resulting in geometrically modulated signal 180.

FIG. 9 is an electronic schematic of the FM restore circuitry in the geometrically modulated receiver of FIG. 7. Signal 182 from the diode detector 108 increases the gain on transistor which results in an increase in the amplitude of geometrically modulated input wave 186, yielding a standard FM signal.

Figure 10:
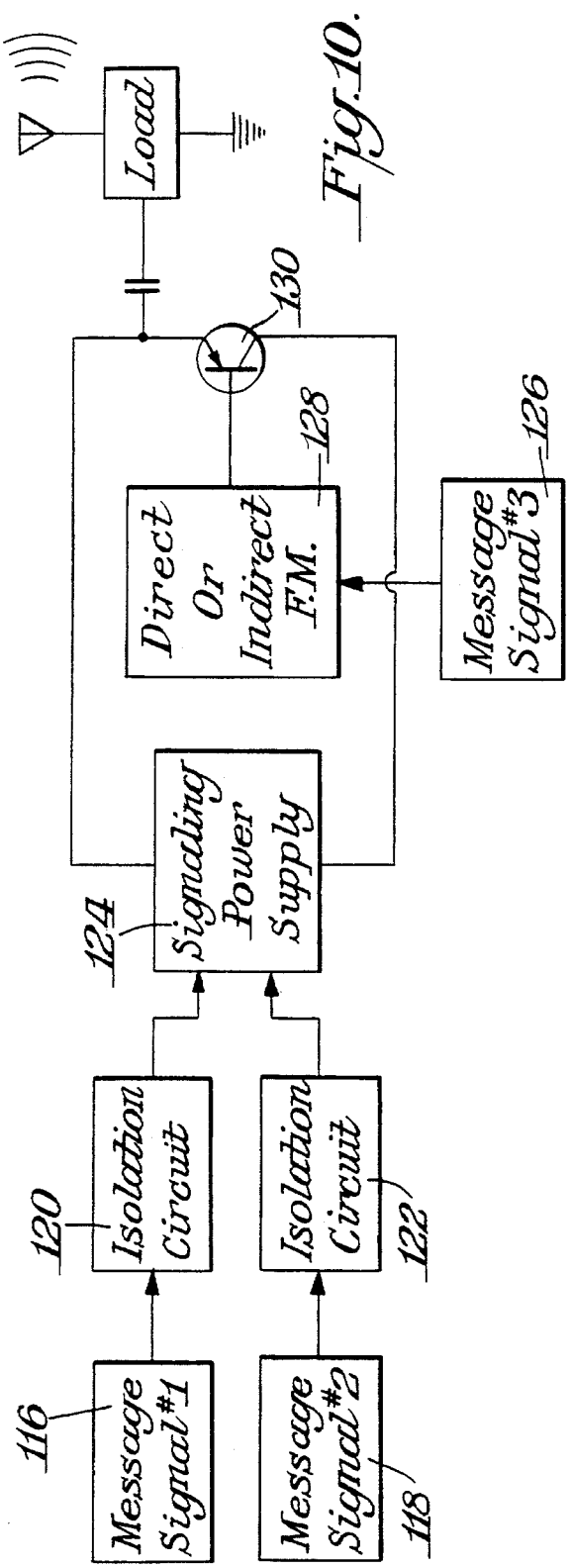
FIG. 10 is a step-block diagram of a preferred embodiment of the present invention.

A particularly preferred embodiment of this invention, wherein the informational content of a transmitted signal is increased by a factor of three is shown in FIG. 10. Message signal 1, reference numeral 116, is a data, audio or other signal which is desired to be transmitted. Message signal 2, reference numeral 118 is also a data, audio, or other signal which is desired to be transmitted. After passing through respective isolation circuits 120 and 122, these message signals direct the signaling power supply 124 (asymmetric), which emits a controlling signal. In the interim, a third message signal 126 is encoded into a direct or indirect FM signal 128. The signals are mixed in bipolar transistor 130 to generate a signal with a geometrically altered waveform.

FIG. 11 is a graphical representation of a waveform produced by the presently preferred embodiment of the present invention. Message signal 1 results in an upper waveform encoded as a rectilinear envelope 132. Message signal 2 results in a lower waveform encoded as a sinusoidal waveform 134. Message signal 3 is the standard FM signal 136.

One feature of the present invention is its ability to change the voltage gain of the FM signal without effecting the harmonic content of the wave. This artificially sculpted geometry, not relying upon wave interference characteristics, enables an additional message signal to be placed in the upper and lower signal envelopes, without the necessary addition of excessively expensive and costly circuitry.

Figure 13:
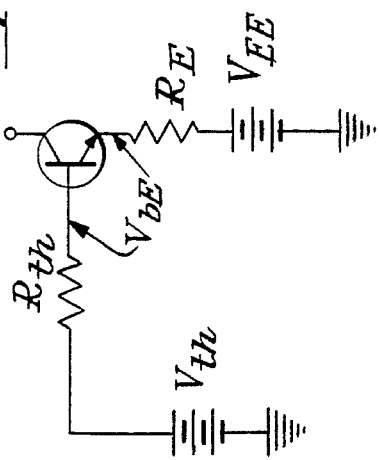
FIG. 13 is an electronic schematic of a Thelvin equivalent circuit.
Figure 12:
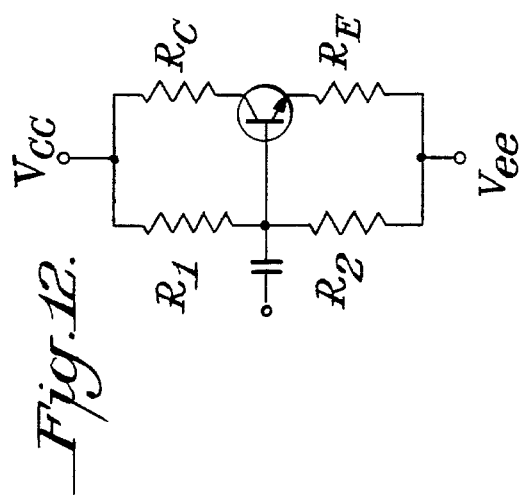
FIG. 12 is an electronic schematic of a transistor amplifier array.

FIG. 12 is a transistor amplifier array according to the present invention, and FIG. 13 is its Thevenin equivalent circuit.

Frequency modulation occurs when the change in frequency of the carrier wave is proportional to the modulating wave amplitude. The relationship is governed by the equation $$V = V_c \sin(\omega_c t + M_F \sin \omega_M t)$$

where the modulation index $$V_{th} = \frac{V_{cc} R_2}{R_1 + R_2} + V_{ee}$$

By utilizing simple geometric relationships and Kirkoff's laws, it may be seen that if $V_{ee}$ and $V_{cc}$ are functions of time, then the "$\beta$" appears to fluctuate with time in accordance with the waveforms. Thus, the signaling power supply varies at an information rate, and therefore the resulting change in gain of the transistor changes the output waveform to coincide with the envelopes. The envelopes contain the message (sinusoidal wave) or data (square wave) signal.

This may be seen by reference to the following geometric proof. As noted above, this proof is offered only by way of explanation, and not by limitation. The applicants are not bound by this or any other theory.

The array of FIG. 13 is solved as follows:

$$M_F = \frac{\text{Maximum carrier frequency}}{\text{modulating frequencies}}.$$

solving for $R_{th}$, $$R_{th} = \frac{R_1 R_2}{R_1 + R_2}$$

utilizing Kirkhoff's laws, $$V_{th} - I_b R_{th} - V_{be} - (\beta + 1) I_b R_E - V_\epsilon \epsilon = 0$$

$$\frac{V_{cc} R_2}{R_1 + R_2} - \frac{I_b R_1 R_2}{R_1 + R_2} - V_{be} - (\beta + 1) I_b R_E - V_{ee} = 0$$

$$\beta + 1 = \frac{V_{\epsilon\epsilon}}{I_b R_E} - \left( \frac{R_2}{R_1 + R_2} \right) \frac{V_{cc}}{I_b R_\epsilon} +$$

$$\frac{R_1 R_2}{(R_1 + R_2) R_E} + \frac{V_{be}}{I_b R_E}$$

$$\beta(t) = \frac{V_{\epsilon\epsilon(t)}}{I_{b(t)} R_E} - \left( \frac{R_2}{R_1 + R_2} \right) \cdot \frac{V_{cc(t)}}{I_{b(t)} R_\epsilon} +$$

$$\frac{R_1 R_2}{(R_1 + R_2) R_E} + \frac{V_{be(t)}}{I_{b(t)} R_E} - 1$$

In other words, if $V_{\epsilon\epsilon}$ and $V_{cc}$ are functions of time, then the "$\beta$" appears to fluctuate with time in accordance with the waveforms.

Figure 14:
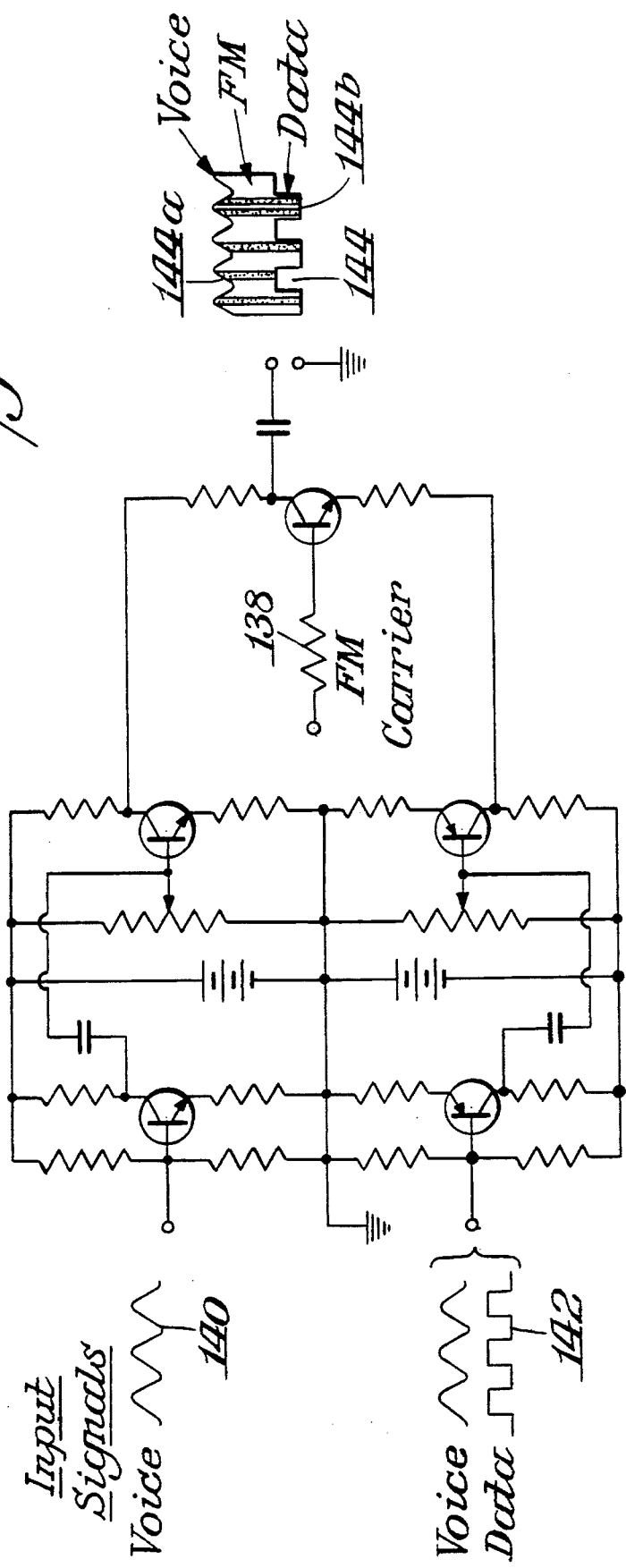
FIG. 14 is an electronic schematic of a preferred embodiment of a transmitter according to the present invention.

FIG. 14 is an electronic schematic of a preferred transmitter device according to the present invention with an asymmetric power supply. A base, or "primary" FM carrier signal 138 of a selected rest frequency is provided. This signal is FM modulated (direct or indirect) by a first input signal 138. Additional input signals 144 (*a*) and 144 (*b*) are provided for the upper and lower waveforms. In this particular embodiment, voice input 140 (first additional input) controls the signaling power supply for the upper waveform, appending voice input signal 140 in the upper quadrant (positive) of the FM carrier. Data input 142 (second additional input) is appended in the lower quadrant (negative) of the FM carrier, forming the lower waveform.

This circuit generates a complete geometrically modulated waveform 144 with an upper sinusoidal waveform 144a (voice) and a lower square waveform 144 (b) (data).

Figure 15:
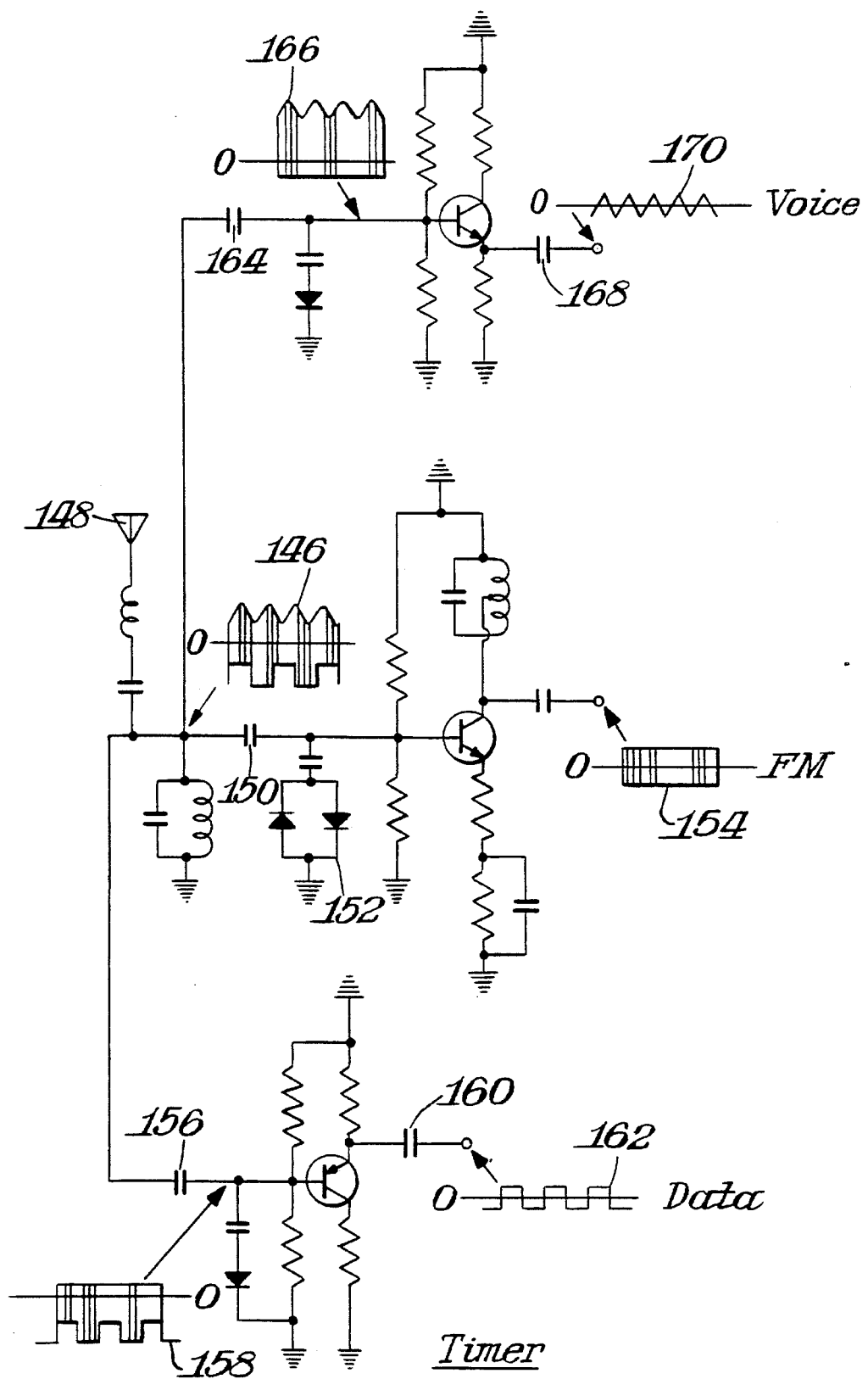
FIG. 15 is an electronic schematic of a preferred embodiment of a receiver ("tuner") according to the present invention.

FIG. 15 is an electronic schematic of a preferred receiver, or "tuner" device according to the present invention. Incoming geometrically modulated electromagnetic signal waveform 146 is received at antenna 148.

High pass filter 150 removes the upper and lower waveforms, in conjunction with limiter 152, a regulated signal of a certain peak-to-peak voltage is provided (a standard FM signal). This provides restored FM signal 154.

High pass filter 156 provides waveform 158, which contains the lower waveform portion. It is passed through capacitor 160 to yield data signal 162.

High pass filter 164 yields waveform 166, which contains the upper waveform envelope. When waveform 166 is passed through capacitor 168, voice signal 170, a sinusoidal waveform is recovered.

Thus, the present invention demonstrates a novel and useful manner in which bandwidth and energy may be conserved by adding additional signals onto an existing electromagnetic signal, without requiring excessively expensive modifications or equipment, which would also be compatible with existing FM receivers, an important consideration for Federal Communications Commission (FCC) approval and regulation.

One major advantage of the novel modulation method and apparatus of the present invention is that data in the form of square waves may be transmitted over a conventional transmission system. Due to the variance of the speed of light in various media, the waveform of a square wave, especially useful in digital data, normally cannot be encoded and transmitted over cables. A square wave requires instantaneous voltage changes, which cannot be transmitted with sufficient speed through copper or other media to maintain the sharp waveforms required for clear data transmission.

The lag time present in the material softens the square waves, making them almost trapezoidal in shape. By incorporating the waveforms into an already modulated signal, digital data may be transmitted.

I claim:

1. A method of modulating an electromagnetic signal, comprising the steps of:
   providing a primary carrier wave having a first selected rest frequency, which primary carrier wave is modulated by varying its frequency according to a first input signal having a frequency lower than the rest frequency of the primary carrier wave;
   providing at least one additional input signal, said at least additional input signal having a frequency lower than the rest frequency of the primary carrier wave; and
   varying the gain of the primary carrier wave with a power supply that varies at the rate of the said at least one additional input signal, whereby the external waveform of the primary carrier wave is altered at an information rate corresponding to said additional input signal.

2. A method as claimed in claim 1, wherein the power supply is a symmetric power supply.

3. A method as claimed in claim 1, wherein the additional input signal comprises a square wave.

4. A method as claimed in claim 1, wherein the additional input signal comprises a sinusoidal wave.

5. A method of modulating an electromagnetic signal, comprising the steps of:
   providing a primary carrier wave having a first selected rest frequency, which primary carrier wave is modulated by varying its frequency according to a first input signal having a frequency lower than the rest frequency of the primary carrier wave;
   providing a plurality of additional input signals, each additional input signal having a frequency lower than the rest frequency of the primary carrier wave; and
   varying the gain of the primary carrier wave with a power supply that varies at the rate of each additional input signal, whereby the external waveform of the primary carrier wave is altered at an information rate corresponding to said plurality of additional information signals.

6. A method as claimed in claim 3, wherein the power supply is an asymmetric power supply.

7. A method as claimed in claim 5, wherein the plurality of information signals comprises two additional information signals.

8. A method as claimed in claim 7, wherein the two additional data signals are in the form of sinusoidal waves.

9. A method as claimed in claim 7, wherein the two additional data signals are in the form of square waves.

10. A method as claimed in claim 7, wherein the two additional data signals are in the form of
    a square wave, and
    a sinusoidal wave.

11. A method of modulating an electromagnetic signal, comprising the steps of:
    providing a primary carrier wave having an external waveform with an upper waveform and a lower waveform, said primary carrier wave having a first selected rest frequency, which primary carrier wave is modulated by varying its frequency according to a first input signal having a frequency lower than the rest frequency of the primary carrier wave;
    providing two additional input signals, each of said additional input signals having a frequency lower than the rest frequency of the .primary carrier wave; and
    varying the gain of the primary carrier wave at the rate of each additional input signal, whereby the external waveform of the primary carrier wave is altered at an information rate corresponding to said plurality of additional information signals;
    wherein one additional input signal controls the upper waveform, and the other additional input signal controls the lower waveform.

12. A receiver for receiving an incoming geometrically modulated electromagnetic signal having a primary carrier wave which is frequency modulated by an input signal, and geometrically modulated by at least one additional input signal, comprising:
    a means for removing the at least one additional geometrically modulating input signal from the incoming geometrically modulated signal without damaging the harmonic content of the primary carrier wave;
    a means for decoding the one additional input signal removed from the incoming geometrically modulated signal; and
    a means for decoding the frequency modulated primary carrier wave, whereby the frequency modulating input signal and the geometrically modulating additional input signal are recovered from a single geometrically modulated carrier wave.

13. A receiver as claimed in claim 12, further comprising a tank circuit whereby the incoming geometrically modulated signal is amplified and split.

14. A receiver as claimed in claim 12, wherein the means for removing the geometrically modulating additional input signal is a low pass filter.

15. A receiver for receiving an incoming geometrically modulated electromagnetic signal having a primary carrier wave which is frequency modulated by an input signal, and geometrically modulated by a plurality of additional input signals, comprising:

a means for removing the additional geometrically modulating input signals from the incoming geometrically modulated signal without damaging the harmonic content of the primary carrier wave;

a means for decoding the additional input signals removed from the incoming geometrically modulated signal; and a means for decoding the frequency modulated primary carrier wave, whereby the frequency modulating input signal and the geometrically modulating additional input signal are recovered from a single geometrically modulated carrier wave.

16. A receiver as claimed in claim 15, further comprising a tank circuit whereby the incoming geometrically modulated signal is amplified and split.

17. A receiver as claimed in claim 15, wherein the means for removing the geometrically modulating additional input signal is a low pass filter.

18. A receiver as claimed in claim 15 wherein there are two additional input signals.

19. A receiver as claimed in claim 18, wherein the two additional data signals comprise a sinusoidal wave and a square wave.

20. A receiver for receiving an incoming geometrically modulated electromagnetic signal having a primary carrier wave which is frequency modulated by an input signal, and geometrically modulated by a first and a second additional input signals, comprising:

a tank circuit whereby the signal is amplified and split, a first low pass filter whereby the first additional input signal is filtered from the incoming geometrically modulated signal without damaging the harmonic content of the primary carrier wave;

a second low pass filter whereby the second additional input signal is filtered from the incoming geometrically modulated signal without damaging the harmonic content of the primary carrier wave;

a high pass filter which passes the primary carrier wave; and a frequency modulation receiver which decodes the primary carrier wave and extracts a first input signal, whereby three input signals are extracted from a single geometrically modulated electromagnetic signal.

21. A transmitter for geometrically modulating and transmitting an electromagnetic signal having a primary carrier wave of a selected rest frequency and a geometrically modulated external waveform, comprising:

a transmitter which varies the frequency of the primary carrier wave according to a first input signal;

a power supply which varies the shape of the external waveform of the primary carrier wave envelope according to at least one additional input signal by adjusting power output, whereby the external waveform of the primary carrier wave is altered at an information rate and additional data is carried.

22. A transmitter as claimed in claim 21, wherein the power supply is a symmetric power supply.

23. A transmitter as claimed in claim 21, wherein the power supply is an asymmetric power supply.

24. A transmitter as claimed in claim 21, wherein the at least one additional input signal is a sinusoidal wave, a square wave, a triangular wave, or binary or digital input.

\* \* \* \* \*